United States Patent
Chang

(10) Patent No.: US 11,894,733 B2
(45) Date of Patent: Feb. 6, 2024

(54) MANUAL AND REMOTE CONTROL FORWARD AND REVERSE ROTATION CONTROL DEVICE FOR DC BRUSHLESS CEILING FAN AND CONTROL METHOD THEREOF

(71) Applicant: Rhine Electronic Co., Ltd., Taichung (TW)

(72) Inventor: Yi-Kai Chang, Taichung (TW)

(73) Assignee: RHINE ELECTRONIC CO., LTD., Taichung (TW)

( * ) Notice: Subject to any disclaimer, the term of this patent is extended or adjusted under 35 U.S.C. 154(b) by 404 days.

(21) Appl. No.: 17/478,703

(22) Filed: Sep. 17, 2021

(65) Prior Publication Data

US 2023/0071738 A1    Mar. 9, 2023

(30) Foreign Application Priority Data

Sep. 7, 2021    (TW) ................................. 110133208

(51) Int. Cl.
| | |
|---|---|
| *H02K 11/33* | (2016.01) |
| *H02K 11/30* | (2016.01) |
| *H02K 11/35* | (2016.01) |
| *F04D 27/00* | (2006.01) |
| *F04D 25/08* | (2006.01) |

(52) U.S. Cl.
CPC ............. *H02K 11/33* (2016.01); *H02K 11/30* (2016.01); *H02K 11/35* (2016.01); *F04D 25/088* (2013.01); *F04D 27/004* (2013.01)

(58) Field of Classification Search
CPC ........ H02K 11/30; H02K 11/33; H02K 11/35; H02K 11/38; H02K 5/225; F04D 25/088; F04D 27/004; Y02B 30/70
USPC .................................................. 310/68 R, 71
See application file for complete search history.

(56) References Cited

U.S. PATENT DOCUMENTS

| | | | | |
|---|---|---|---|---|
| 7,196,485 B1* | 3/2007 | Lee | .......................... | F24F 7/007 318/400.38 |
| 10,158,309 B1* | 12/2018 | Lin | ........................ | F04D 27/004 |
| 10,469,001 B1* | 11/2019 | Liao | ....................... | F04D 27/004 |

\* cited by examiner

*Primary Examiner* — Alexander A Singh
(74) *Attorney, Agent, or Firm* — Sinorica International Patent & Trademark

(57) ABSTRACT

Disclosed are a manual and remote control forward and reverse rotation control device and its control method for DC brushless ceiling fans. The control device includes a power supply, a remote control, a manual control switch assembly and a ceiling fan brushless motor which are electrically connected with one another. A gear position signal can be inputted from a remote end to determine and control the forward and reverse rotations of a brushless motor of the ceiling fan. The remote control can be connected externally by an existing control line or a manual controller module without requiring additional wiring, so as to improve the diversity of structural mechanism, increase the versatility of remote operation, and achieve good functionality and variability of applications.

5 Claims, 6 Drawing Sheets

MANUAL AND REMOTE CONTROL FORWARD AND REVERSE ROTATION CONTROL DEVICE FOR DC BRUSHLESS CEILING FAN AND CONTROL METHOD THEREOF

FIELD OF THE INVENTION

The present invention relates to the technical field of a DC brushless ceiling fan manual and remote control forward and reverse rotation control device and its control method, and more particularly to the control device and method applied to a forward and reverse rotation determination device to achieve the multi-mode control of a ceiling fan.

BACKGROUND OF THE INVENTION

With reference to FIGS. 5 and 6 for a conventional ceiling fan control structure, a conventional manual controller as shown in FIG. 5 is comprised of a manual controller 30 and a ceiling fan brushless motor 20, and the manual controller 30 has a side connected to a power supply 1 and a forward and reverse rotation switch 31, and the other side connected to the ceiling fan brushless motor 20. The forward and reverse rotation switch 31 is provided to manually control the forward and reverse rotation of the ceiling fan brushless motor 20. In FIG. 6, the manual and remote control controller further includes a remote control receiver 32 installed between the power supply 1 and the manual controller 30, and the wiring of a signal line of the original manual controller 30 is required before the remote control receiver 32 can be connected to achieve the purpose of remote control. Although the rotational speed of the ceiling fan brushless motor 20 can be controlled in a remote control manner, the forward and reverse rotation still can be controlled by manually adjusting the forward and reverse rotation switch 31 only, thus obviously causing inconvenience in use and definitely requiring improvements.

SUMMARY OF THE INVENTION

In view of the aforementioned drawbacks of the conventional ceiling fan control structure, the inventor of the present invention based on years of experience in the related industry to conduct extensive research and experiment, and finally developed a DC brushless ceiling fan manual and remote control forward and reverse rotation control device that can overcome the drawbacks including the inconvenience of use of the ceiling fan control structure and the limitation of the remote control operation.

Therefore, it is a primary objective of the present invention to overcome the drawbacks of the prior art by providing a DC brushless ceiling fan manual and remote control forward and reverse rotation control device and its control method, comprising a power supply, a remote control and manual control switch group and a ceiling fan brushless motor. The remote control and manual control switch group includes a remote controller module and a manual controller module, and the remote controller module includes a microcontroller unit, a remote control receiver unit, a first relay, a second relay and an output contact, wherein the first relay is connected to a first wiring; the first wiring is connected to a forward diode; the second relay is connected to a second wiring; the second wiring is connected to a backward diode; the remote control receiver unit is connected to the microcontroller unit; the microcontroller unit is connected in parallel to the first relay and the second relay; the first wiring is connected to the forward diode and the second wiring is connected to the backward diode and then connected in parallel to the power-off gear contact; the manual controller module includes a first detector, a second detector, a forward and reverse rotation switch, a power supply unit, a microcontroller unit and a motor driving unit; the first detector and second detector has an end connected to the power supply unit and the other end connected to the forward and reverse rotation switch and the microcontroller unit; the microcontroller unit is connected to the motor driving unit and its power supply is connected in parallel to the microcontroller unit and the remote control receiver unit of the remote controller module; the output contact is connected in parallel to the first detector; the second detector and the power sup unit of the manual controller module; and the motor driving unit is connected to the ceiling fan brushless motor.

In a preferred embodiment, the remote controller module is connected to the manual controller module, and the remote controller module and the manual controller module are used to perform the remote control of the ceiling fan brushless motor forward and reverse rotation and provided for users to make changes for the use, so as to provide a multi-mode control of a ceiling fan.

In the control method of the DC brushless ceiling fan manual and remote control forward and reverse rotation control device of the invention, the microcontroller unit of the remote controller module of the remote control and manual control switch group stores a remote control and manual control forward and reverse rotation protocol control information, and the microcontroller unit of the manual controller module stores a gear speed change determination information, a forward and reverse rotation memory determination information, and a remote control and manual control forward and reverse rotation protocol determination information, and the remote controller module and the manual controller module directly input voltage from the power supply, and the voltage outputted from the first relay and the second relay of the remote controller module after being directly inputted to the first wire body and the second wire body is of a sine wave, and the voltage inputted from the first relay into the first wire body and outputted from the forward diode is in a positive half cycle, and the voltage inputted from the second relay into the second wire body and outputted from the backward diode is in a negative half cycle, and the outputted voltage waveform signal is used to determine a rotational speed by using the gear speed change determination information stored in the microcontroller unit of the manual control module, and then the motor driving unit controls the rotational speed of the ceiling fan brushless motor to perform a remote rotational speed control. When the manual control module determines the forward and reverse rotation, the microcontroller unit of the manual control module uses the remote control and manual control forward and reverse rotation protocol determination information to determine the forward and reverse rotation switch direction of the manual controller module, after the power supply is turned on, wherein if the forward and reverse rotation switch is switched to change the forward and reverse rotation direction, the microcontroller unit will revise the stored forward and reverse rotation memory with the forward and reverse rotation switch direction, or else the forward and reverse rotation switch forward and reverse rotation direction and the forward and reverse rotation memory stored in the microcontroller unit will be the same, and the original memory will remain unchanged; and the microcontroller unit of the remote controller module uses the remote control and manual control forward and reverse rotation protocol control information to control the forward and reverse rotation, wherein if the microcontroller unit of the manual control module determines that there is an input of a forward and reverse rotation change information, then the microcontroller unit of the manual controller will revise the stored forward and reverse rotation in memory, and a control message will be sent to the motor driving unit to control the forward and reverse rotation.

The power supply is inputted into the remote control and manual control switch group and the ceiling fan brushless motor, so that the forward and reverse rotation of the ceiling fan brushless motor can be controlled by the forward and reverse rotation switch of the manual controller module. In addition, the remote control and manual control forward and reverse rotation protocol control information stored in the microcontroller unit of the remote controller module can also be used to control the forward and reverse rotation according to a gear speed change and input a gear speed signal of the remote controller module to control the gear speed and the forward and reverse rotation of the remote control ceiling fan brushless motor. For the ceiling fan brushless motor with the manual controller module only, a present existing control line can be used to connect the remote controller module and the manual controller module, so that the remote controller can be connected externally by the existing control line or the manual controller module without requiring additional wiring, so as to improve the diversity of structural mechanism, increase the versatility of remote operation, and achieve good functionality and variability of applications.

DESCRIPTION OF THE PREFERRED EMBODIMENTS

Figure 1:
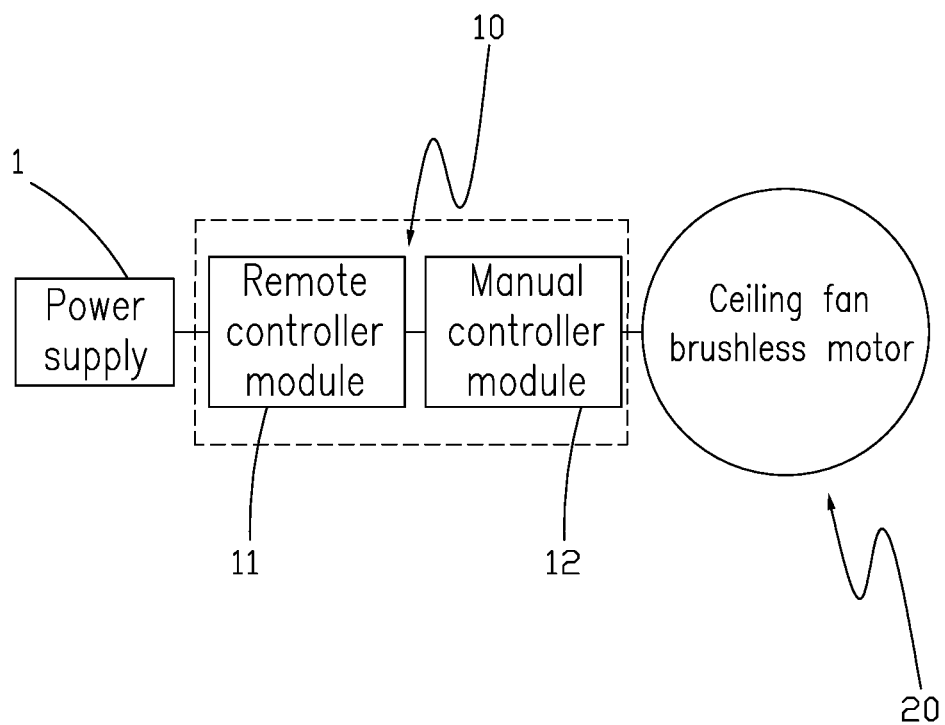
FIG. 1 is a schematic block diagram showing the whole assembly of a DC brushless ceiling fan manual and remote control forward and reverse rotation control device of the present invention.

The technical contents of the present invention will become apparent with the detailed description of preferred embodiments accompanied with the illustration of related drawings as follows. It is intended that the embodiments and figures disclosed herein are to be considered illustrative rather than restrictive.

With reference to FIGS. 1 to 4 for the schematic views of a DC brushless ceiling fan manual and remote control forward and reverse rotation control device, a remote controller module of a remote control and manual control switch group, a manual controller module of the remote control and manual control switch group, the remote controller module and manual controller module of the manual control switch group, and the whole remote control and manual control switch group in accordance with the present invention respectively, the control device includes:

a power supply 1;

a remote control and manual control switch group 10, having a remote controller module 11 and a manual controller module 12, wherein the remote controller module 11 includes a microcontroller unit 110, a remote control receiver unit 111, a first relay 112, a second relay 113 and an output contact 114; the first relay 112 is connected to a first wiring 112A; the first wiring 112A is connected to a forward diode 112B; the second relay 113 is connected to a second wiring 113A; the second wiring 113A is connected to a backward diode 113B; the remote control receiver unit 111 is connected to a microcontroller unit 110; the microcontroller unit 110 is connected in parallel to the first relay 112 and the second relay 113; the first wiring 112A is connected to a forward diode 112B and the second wiring 113A is connected to a backward diode 113B and then connected in parallel to a power-off gear contact 114; the manual controller module 12 includes a first detector 120, a second detector 121, a forward and reverse rotation switch 122, a microcontroller unit 123 and a motor driving unit 124; the first detector 120, the second detector 121 and the forward and reverse rotation switch 122 are connected to the microcontroller unit 123; the microcontroller unit 123 is connected to the motor driving unit 124, and its power supply 1 is connected in parallel to the microcontroller unit 110 and the remote control receiver unit 111 of the remote controller module 11; and the output contact 114 is connected in parallel to the first detector 120 and the second detector 121 of the manual controller module 12; and a ceiling fan brushless motor 20, connected to the motor driving unit 124 of the remote control and manual control switch group 10.

By the aforementioned structure, the DC brushless ceiling fan manual and remote control forward and reverse rotation control device of the present invention is formed.

Figure 2:
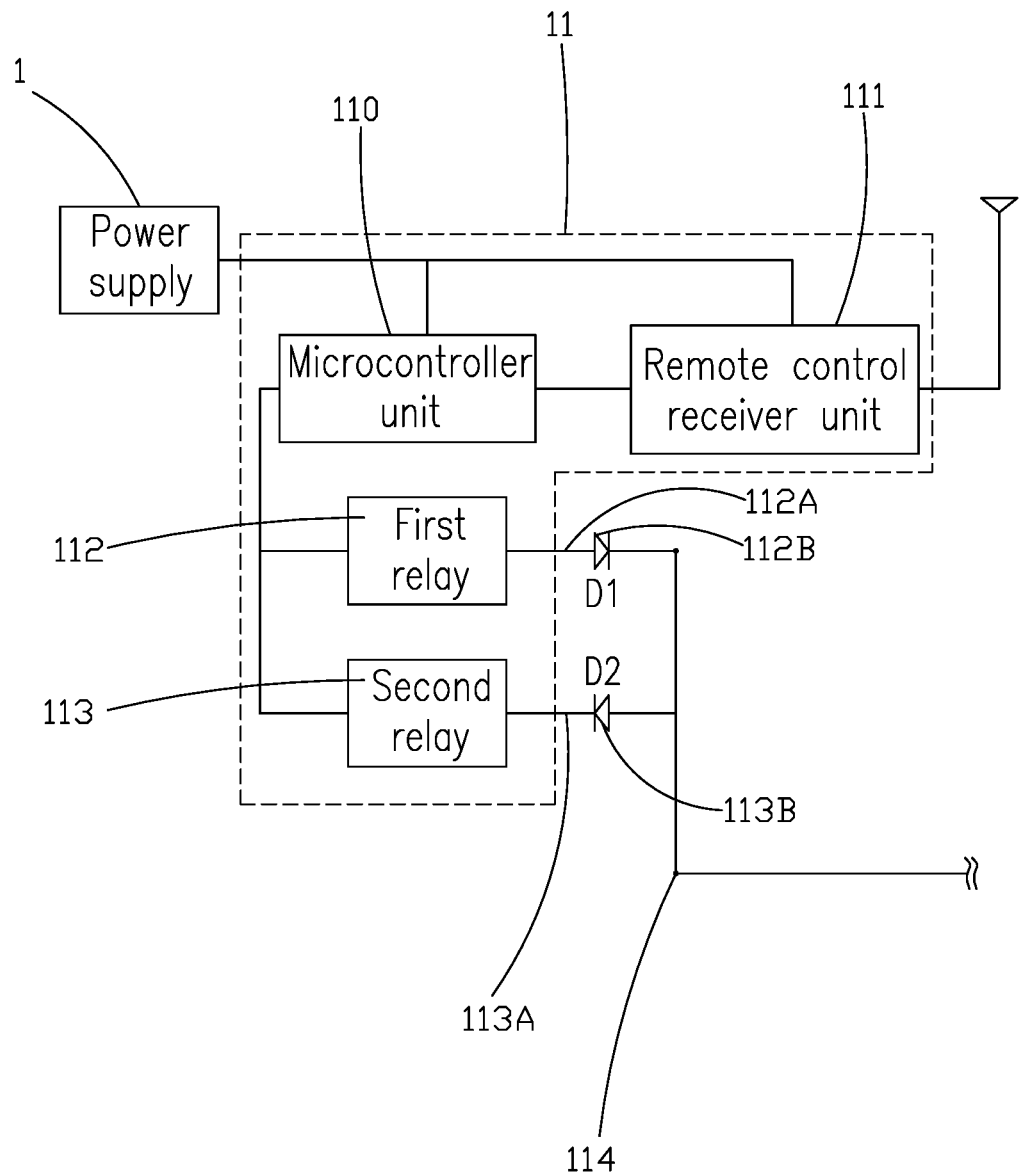
FIG. 2 is a schematic block diagram showing the assembly of a remote controller module of a remote control and manual control switch group of a DC brushless ceiling fan manual and remote control forward and reverse rotation control device of the present invention.
Figure 3:
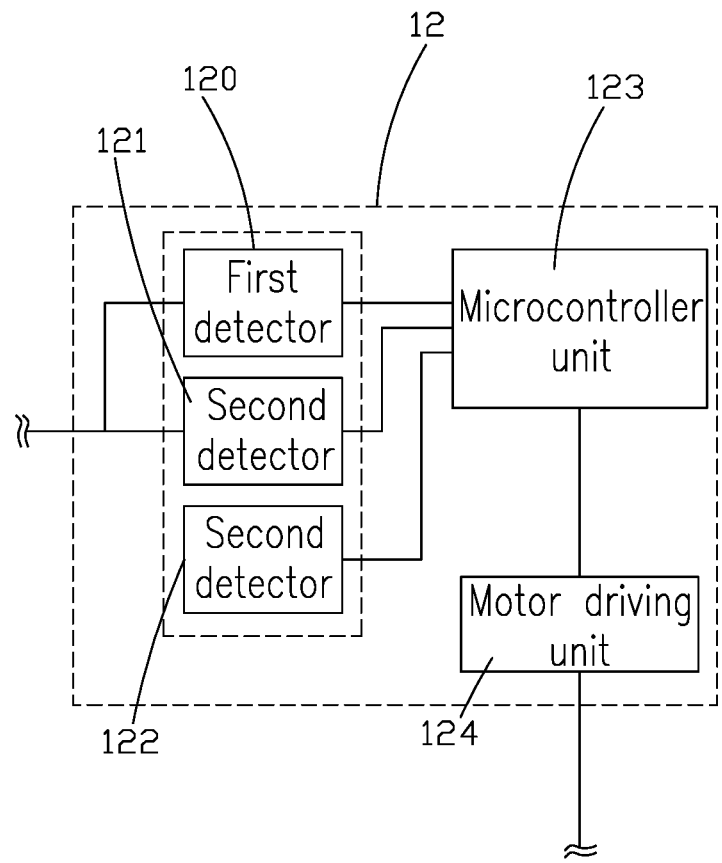
FIG. 3 is a schematic block diagram showing the assembly of a manual control module of a remote control and manual control switch group of a DC brushless ceiling fan manual and remote control forward and reverse rotation control device of the present invention.
Figure 4:
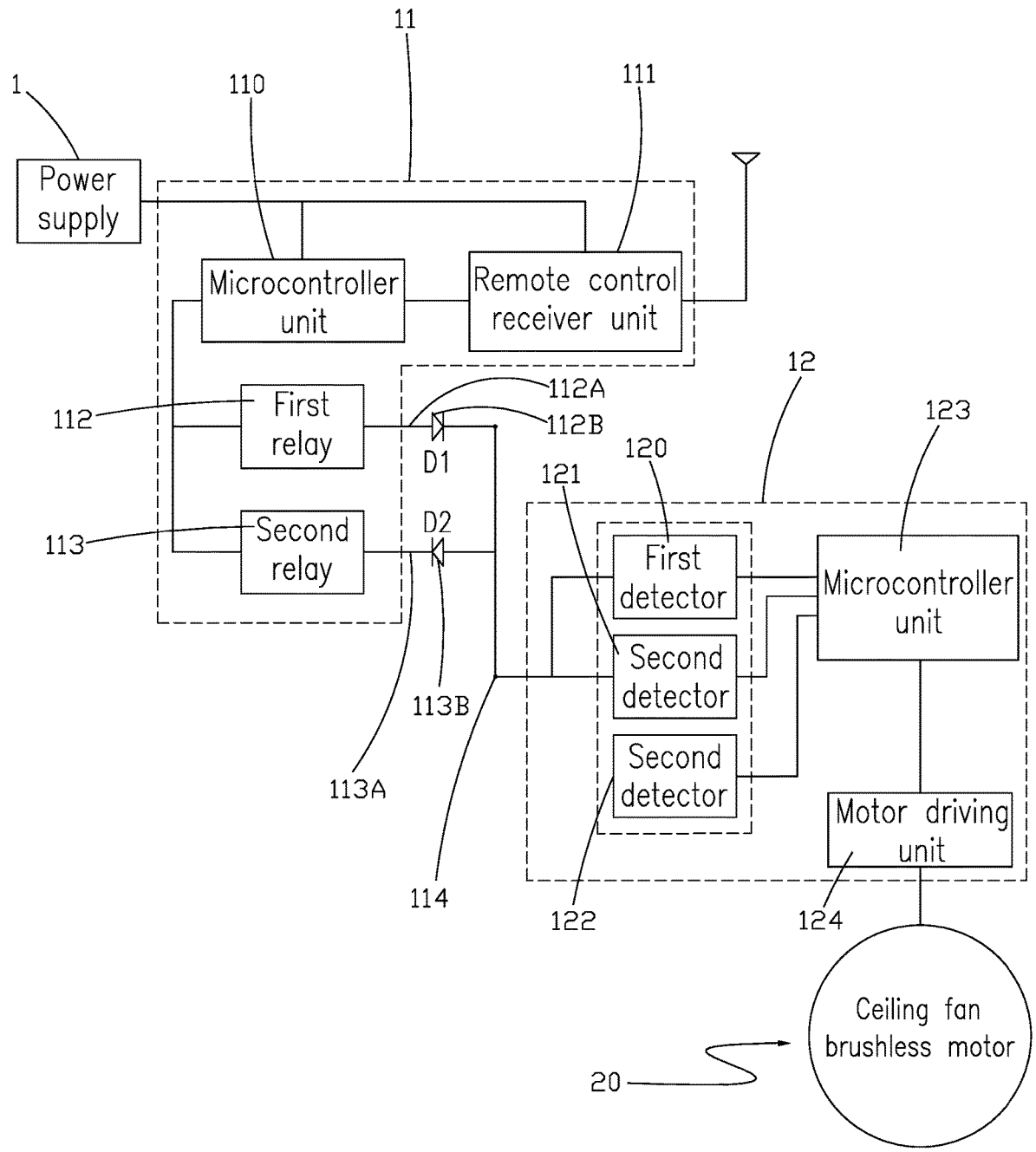
FIG. 4 is a schematic block diagram showing the whole assembly of a remote control and manual control switch group of a DC brushless ceiling fan manual and remote control forward and reverse rotation control device of the present invention.
Figure 5:
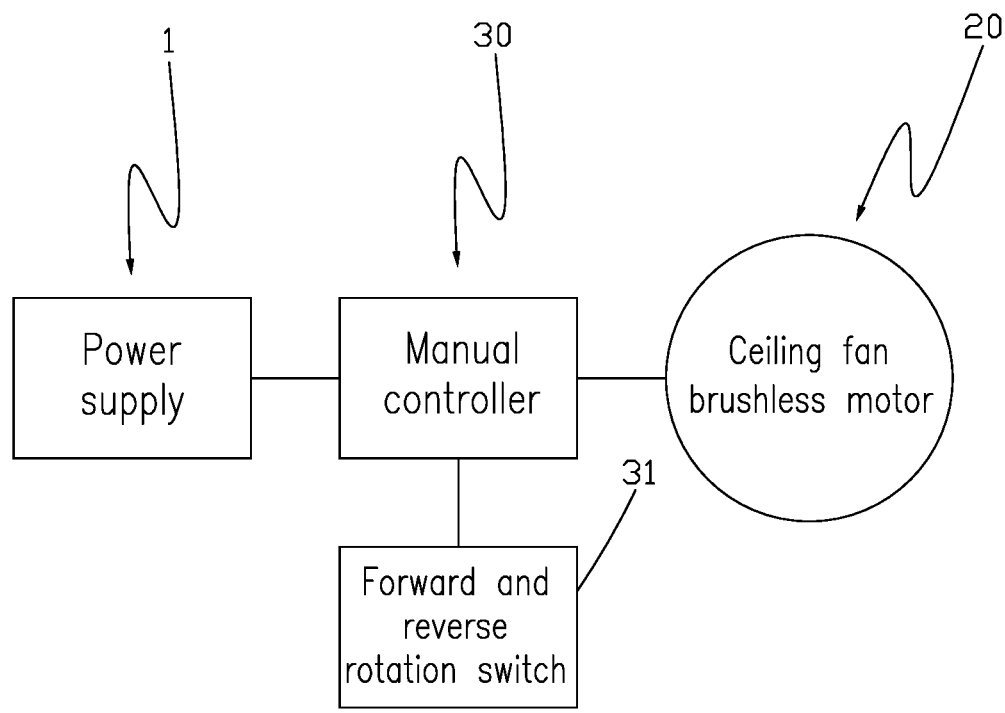
FIG. 5 is a schematic block diagram showing the assembly of a conventional manual controller installed in a DC brushless ceiling fan forward and reverse rotation control device of the present invention.
Figure 6:
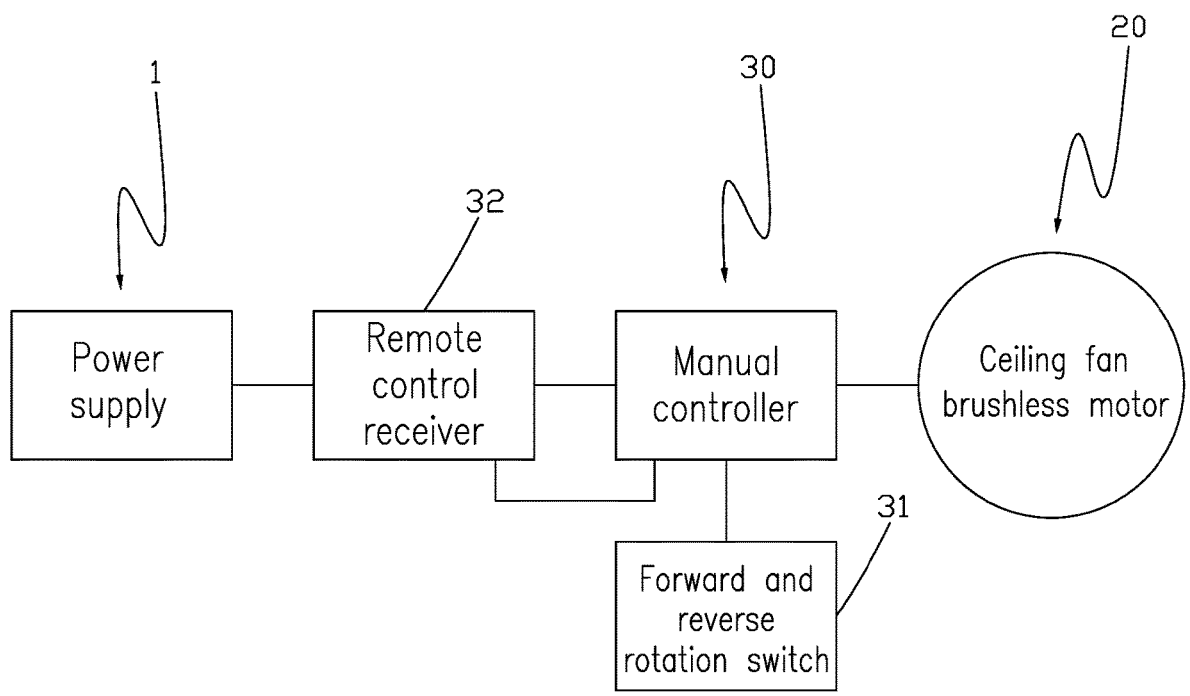
FIG. 6 is a schematic block diagram showing the assembly of a conventional manual and remote control controller installed in a DC brushless ceiling fan forward and reverse rotation control device of the present invention.

With reference to FIGS. 2 to 4 for the schematic block diagrams of a remote controller module and a manual controller module of a remote control and manual control switch group of a DC brushless ceiling fan manual and remote control forward and reverse rotation control device and the whole remote control and manual control switch group in accordance with the present invention respectively, the power supply 1 is connected in parallel to the microcontroller unit 110 and the remote control receiver unit 111 of the remote controller module 11, and the output contact 114 is connected in parallel to the first detector 120 and the second detector 121 of the manual controller module 12, and the motor driving unit 124 is connected to the ceiling fan brushless motor 20, and the power supply 1 inputs power into the remote control and manual control switch group 10 and the ceiling fan brushless motor 20, so that the ceiling fan brushless motor 20 can be controlled to rotate in forward and reverse directions by the forward and reverse rotation switch 122 of the manual controller module 12. In addition, the remote control and manual control forward and reverse rotation protocol control information stored in the microcontroller unit 110 of the remote controller module 11 can be used to control the forward and reverse rotation according to a gear speed change, and a gear speed signal of the remote controller module 11 can be inputted to control the forward and reverse rotation of the remote control ceiling fan brushless motor 20. For the ceiling fan brushless motor 20 with the manual controller module 12 only, an existing control line can be used to connect the remote controller module 11 and the manual controller module 12 without requiring additional wiring, so as to improve the diversity of structural mechanism, increase the versatility of remote operation, and achieve good functionality and variability of applications.

In FIGS. 2 to 4, the control method of the DC brushless ceiling fan manual and remote control forward and reverse rotation control device of the present invention comprises the following steps: The microcontroller unit 110 of the remote controller module 11 of the remote control and manual control switch group 10 stores a remote control and manual control forward and reverse rotation protocol control information, and the manual controller module 12 stores a gear speed change determination information, a forward and reverse rotation memory determination information and a remote control and manual forward and reverse rotation gear speed determination protocol memory information, and voltage is inputted directly from the power supply 1 to the remote controller module 11 and the manual controller module 12, the first and second relays 112, 113 of the remote controller module 11, and the first and second wire bodies 112A, 113A, and the outputted voltage has a sine wave, and the voltage inputted from the first relay 112 into the first wire body 112A and outputted from the forward diode 112B is in a positive half cycle, and the voltage inputted from the second relay 113 into the second wire body 113A and outputted from the backward diode 113B is in a negative half cycle. The outputted voltage waveform signal is detected by the first detector 120 and the second detector 121 of the manual controller module 12 and then the microcontroller unit 123 determines a rotational speed according to the signal and sends a control message to the motor driving unit 124 to control the rotational speed of the ceiling fan brushless motor 20, so as to perform a remote rotational speed control. When the manual controller module 12 performs the forward and reverse rotation determination, the microcontroller unit 123 of the manual controller module 12 determines the direction of the forward and reverse rotation switch 122 of the manual controller module 12 by the remote control and manual control forward and reverse rotation protocol determination information, after the power supply 1 is turned on. If the forward and reverse rotation switch 122 is switched to change the forward and reverse rotation direction, then the microcontroller unit 123 will revise the stored forward and reverse rotation memory signal in line with the direction of the forward and reverse rotation switch 122. On the other hand, if it is determined that the forward and reverse rotation switch 122 has not been switched to change the direction of the forward and reverse rotation, then the forward and reverse rotation direction of the forward and reverse rotation switch 122 and the forward and reverse rotation memory stored in the microcontroller unit 123 will be the same, and the original memory will remain unchanged. The microcontroller unit 110 of the remote controller module 11 uses the remote control and manual control forward and reverse rotation protocol control information to perform the forward and reverse rotation control. If the microcontroller unit 123 of the manual control module 12 determines that there is an input of a forward and reverse rotation change signal, then the microcontroller unit 123 of the manual controller 12 will revise the forward and reverse rotation in the memory and send a control message to the motor driving unit 124 to control the forward and reverse rotation.

In FIG. 4, the remote controller module 11 is connected to the manual controller module 12, and the remote controller module 11 together with the manual controller module 12 are used for the remote control of the forward and reverse rotation of the ceiling fan brushless motor 20 and provided for users to make changes of the application, so as to provide a multi-mode control of the ceiling fan In summation of the description above, the present invention can achieve the aforementioned functions and objectives and comply with patent application, and is thus filed for patent application. While the invention has been described by means of specific embodiments, numerous modifications and variations could be made thereto by those skilled in the art without departing from the scope and spirit of the invention set forth in the claims.

What is claimed is:

1. A DC brushless ceiling fan manual and remote control forward and reverse rotation control device, comprising:
a power supply;
a remote control and manual control switch group, having a remote controller module and a manual controller module, and the remote controller module having a microcontroller unit, a remote control receiver unit, a first relay, a second relay and an output contact, wherein the first relay is coupled to a first wiring, the first wiring is coupled to a forward diode, the second relay is coupled to a second wiring, the second wiring is coupled to a backward diode, the remote control receiver unit is coupled to microcontroller unit, the microcontroller unit is coupled in parallel to the first relay and the second relay, the first wiring is coupled to the forward diode, the second wiring is coupled to the backward diode and then coupled in parallel to a power-off gear contact, and the manual controller module comprises a first detector, a second detector, a forward and reverse rotation switch, a microcontroller unit and a motor driving unit, wherein the first detector, the second detector and the forward and reverse rotation switch are coupled to the microcontroller unit, the microcontroller unit is coupled to the motor driving unit and has a power supply coupled in parallel with the microcontroller unit of the remote controller module and the remote control receiver unit, and the output contact is coupled in parallel with the first detector and second detector of the manual controller module; and
a ceiling fan brushless motor, coupled to the motor driving unit of the remote control and manual control switch group.

2. The DC brushless ceiling fan manual and remote control forward and reverse rotation control device according to claim 1, wherein the remote controller module cooperates with the manual controller module to control the ceiling fan brushless motor forward and reverse rotation via remote control.

3. The DC brushless ceiling fan manual and remote control forward and reverse rotation control device according to claim 1, wherein the microcontroller unit of the remote controller module of the remote control and manual control switch group stores a remote control and manual forward and reverse rotation gear speed control protocol, and the manual controller module stores a gear speed change determination information, a forward and reverse rotation memory determination information and a remote control and manual forward and reverse rotation gear speed determination protocol memory information, and the remote controller module and manual controller module directly inputs voltage from the power supply, and after the first relay and the second relay of the remote controller module directly input voltage into the first wire body and second wire body respectively, the voltage is of a sine wave, and the voltage inputted from the first relay into the first wire body and outputted from the forward diode is in a positive half cycle, and the voltage inputted from the second relay into the second wire body and outputted from the backward diode is in a negative half cycle, and an outputted voltage waveform signal is detected by the first detector and the second detector of the manual controller module and used by the microcontroller unit to determine a rotational speed, and sends a control message to the motor driving unit to control the rotational speed of the ceiling fan brushless motor and perform a remote rotational speed control.

4. A DC brushless ceiling fan manual and remote control forward and reverse rotation control method, applied to the DC brushless ceiling fan manual and remote control forward and reverse rotation control device according to claim 3, comprising: the manual control module performing a forward and reverse rotation determination; the microcontroller unit of the manual control module using the remote control and manual control forward and reverse rotation protocol determination information to determine the forward and reverse rotation switch direction of the manual controller module, after turning on the power supply; wherein if the forward and reverse rotation switch is switched to change the forward and reverse rotation direction, the microcontroller unit will revise the stored forward and reverse rotation memory with the forward and reverse rotation switch direction, or else the forward and reverse rotation switch forward and reverse rotation direction and the forward and reverse rotation memory stored in the microcontroller unit will remain the same, and the original memory will be maintained; and the microcontroller unit of the remote controller module using the remote control and manual control forward and reverse rotation protocol control information to control the forward and reverse rotation wherein if the microcontroller unit of the manual control module determines that there is an input of a forward and reverse rotation change information, then the microcontroller unit of the manual controller will revise the stored forward and reverse rotation for memory, and a control message will be sent to the motor driving unit to control the forward and reverse rotation.

5. The DC brushless ceiling fan manual and remote control forward and reverse rotation control device according to claim 4, wherein the power supply is inputted into the remote control and manual control switch group and ceiling fan brushless motor, so that the forward and reverse rotation of the ceiling fan brushless motor can be controlled by the forward and reverse rotation switch of the manual controller module, and a forward and reverse rotation can further be controlled according to a gear speed change through the remote control and manual control forward and reverse rotation protocol control information stored in the microcontroller unit of the remote controller module to input the gear speed signal of the remote controller module, so as to perform a forward and reverse rotation control of the remote control ceiling fan brushless motor.

* * * * *